United States Patent [19]

Oku

[11] Patent Number: 5,276,602
[45] Date of Patent: Jan. 4, 1994

[54] HIGH VOLTAGE POWER SUPPLY CONTROL APPARATUS

[75] Inventor: Juntaro Oku, Numazu, Japan

[73] Assignee: Tokyo Electric Co., Ltd., Tokyo, Japan

[21] Appl. No.: 878,853

[22] Filed: May 5, 1992

[30] Foreign Application Priority Data

May 7, 1991 [JP] Japan .................... 3-101573

[51] Int. Cl.⁵ .................... H02M 3/335; G03G 13/22
[52] U.S. Cl. .................... 363/21; 363/41; 363/97; 355/204; 355/208
[58] Field of Search .................... 363/21, 95, 97, 41; 355/204, 206-208

[56] References Cited

U.S. PATENT DOCUMENTS

| | | | |
|---|---|---|---|
| 4,222,105 | 9/1980 | Shimizu et al. | 364/518 |
| 4,290,101 | 9/1981 | Hergenhan . | |
| 4,355,885 | 10/1982 | Nagashima | 355/204 |
| 4,727,463 | 2/1988 | Suzuki . | |
| 4,791,528 | 12/1988 | Suzuki . | |
| 4,908,753 | 3/1990 | Takahashi . | |
| 4,947,209 | 8/1990 | Maeno et al. | 355/204 |
| 5,045,712 | 9/1991 | Baggenstoss . | |
| 5,146,601 | 9/1992 | Hosaka et al. . | |

FOREIGN PATENT DOCUMENTS

0468513A3  1/1992  European Pat. Off. .
3719713A1  12/1987  Fed. Rep. of Germany .
52-51824    4/1977  Japan .
55-43691   11/1980  Japan .
55-157759  12/1980  Japan .
56-145453  11/1981  Japan .
58-16497    3/1983  Japan .
2-13038     1/1990  Japan .
2047923    12/1980  United Kingdom .

*Primary Examiner*—Emanuel T. Voeltz
*Attorney, Agent, or Firm*—Frishauf, Holtz, Goodman & Woodward

[57] ABSTRACT

A power supply control apparatus, in which a high voltage generated by a switching transistor is prevented from being deviated from a nominal value, includes an arithmetic operator for controlling a duty ratio of switching operation of the switching transistor in response to a feedback value. The arithmetic operator includes a comparator for comparing a reference value with a digitized monitor voltage corresponding to the high voltage, and an adder for adding a minimum unit to the feedback value when the digitized monitor voltage is smaller than the reference value and for subtracting the minimum unit to the feedback value when the digitized monitor voltage is larger than the reference value. The result of addition from the adder is used for controlling the duty ratio of switching operation of the switching transistor.

14 Claims, 10 Drawing Sheets

HIGH VOLTAGE POWER SUPPLY CONTROL APPARATUS

BACKGROUND OF THE INVENTION

1. Field of the Invention

The present invention relates to a high voltage power supply control apparatus used in an electrophotographic mechanism section having a photosensitive body in a copying machine, a laser printer, or the like.

2. Description of the Related Art

An electrophotographic mechanism section used in a copying machine, a laser printer, or the like comprises, e.g., a photosensitive drum. After a photosensitive body of the photosensitive drum is charged by a charging unit, the photosensitive body is exposed by an exposure unit to form an electrostatic latent image on the photosensitive body. A toner is applied to the electrostatic latent image by a developer unit to form a toner image. The toner image is transferred onto transfer paper by a transfer unit.

The electrophotographic mechanism section comprises a high voltage power supply controlling apparatus for applying a high voltage to a charger in the charging unit, a developer sleeve in the developer unit, and a transfer charger in the transfer unit.

In this apparatus, however, since PWM (pulse-width modulation) controllers and A/D (analog-to digital) converters are arranged in correspondence with charging, transferring, and biasing sections, the number of circuit members to be used is undesirably increased, and the apparatus becomes bulky. Since the PWM controllers are independently operated, each PWM controller suffers from a long operation rest period, resulting in poor operation efficiency.

The applicant of the present invention has proposed an improved high voltage power supply control apparatus in which a set of a PWM controller and an A/D converter is commonly used for a plurality of high voltage generating controllers so as to decrease necessary circuit members as well as to reduce the size of the apparatus, thereby increasing the operational efficiency of the PWM controller. (Such an apparatus is disclosed in Japanese patent application No. H 2-197852 which corresponds to U.S. patent application Ser. No. 07/735,300 filed on Jul. 24, 1991, now U.S. Pat. No. 5,202,725, issued Apr. 13, 1993.)

The above apparatus basically performs a comparison between a given reference value and a digital value obtained from the A/D converter so as to add the difference between them to the feedback value or to subtract such difference from the feedback value, so that a duty ratio for controlling the switching operation of switching means varies.

Meanwhile, a monitor voltage of a high voltage power supply controller is liable to be subjected to a noise. If such a noise is contained to the monitor voltage, the magnitude of the difference between the reference value and the digital value obtained by A/D-converting the monitor voltage temporally increases, so that the duty ratio for controlling the switching operation of the switching means changes by a large amount. Then a new problem arises in that a high voltage applied from a high voltage transformer to a load largely deviates from a normal value.

SUMMARY OF THE INVENTION

It is accordingly an object of the invention to provide a high voltage power supply control apparatus in which a duty ratio for controlling the switching operation of switching means is less-sensitive to a noise contained in a monitor voltage, thus preventing a large deviation of the high voltage applied from a high voltage transformer to a load due to the noise.

The present invention is applied to a high voltage power supply control apparatus having a high voltage transformer, in which a high voltage generated by a switching operation of a switching means is applied from the high voltage transformer to a load. To achieve the above object, the high voltage power supply control apparatus comprises a monitor voltage detector for monitoring change in a high voltage generated by the high voltage transformer; an analog-to-digital converter for converting an analog monitor voltage from the monitor voltage detector into a digital value; an arithmetic operator for comparing a predetermined reference value with the digital value from the analog-to-digital converter, and performing an addition/subtraction operation between a predetermined minimum value and a feedback value obtained in response to a result of the comparison so as to provide an arithmetic output; a latch circuit for latching the arithmetic output from the arithmetic operator so as to supply a latched value, as the feedback value, to the arithmetic operator; a reference counter for counting a reference clock; and output control means for controlling by a minimum step a duty ratio for controlling the switching operation of the switching means in accordance with a predetermined frequency reference value, the value latched by the latch circuit, and a count value of the reference counter.

According the above construction of the invention, a change in the high voltage generated by the high voltage transformer is monitored by the monitor voltage detector. A monitor voltage from the monitor voltage detector is subjected to a digital conversion by the analog-to-digital converter. The digitized value is compared with the predetermined reference value in the arithmetic operator. The predetermined minimum step value is added to or subtracted from the feedback value from the latch circuit, in accordance with the result of the comparison.

The output value from the arithmetic operator is latched by the latch circuit. The duty ratio for controlling the switching operation of the switching means is controlling by the minimum step in accordance with the predetermined frequency reference value, the value lathed by the latch circuit, and the count value of the reference counter. Then, even if the monitor voltage largely but temporarily varies due to a noise, the duty ratio of the switching means always changes by only the minimum step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

An embodiment of the present invention will be described below with reference to the accompanying drawings. In this embodiment, the present invention is applied to high voltage generation control in an electrophotographic mechanism section.

Figure 1:
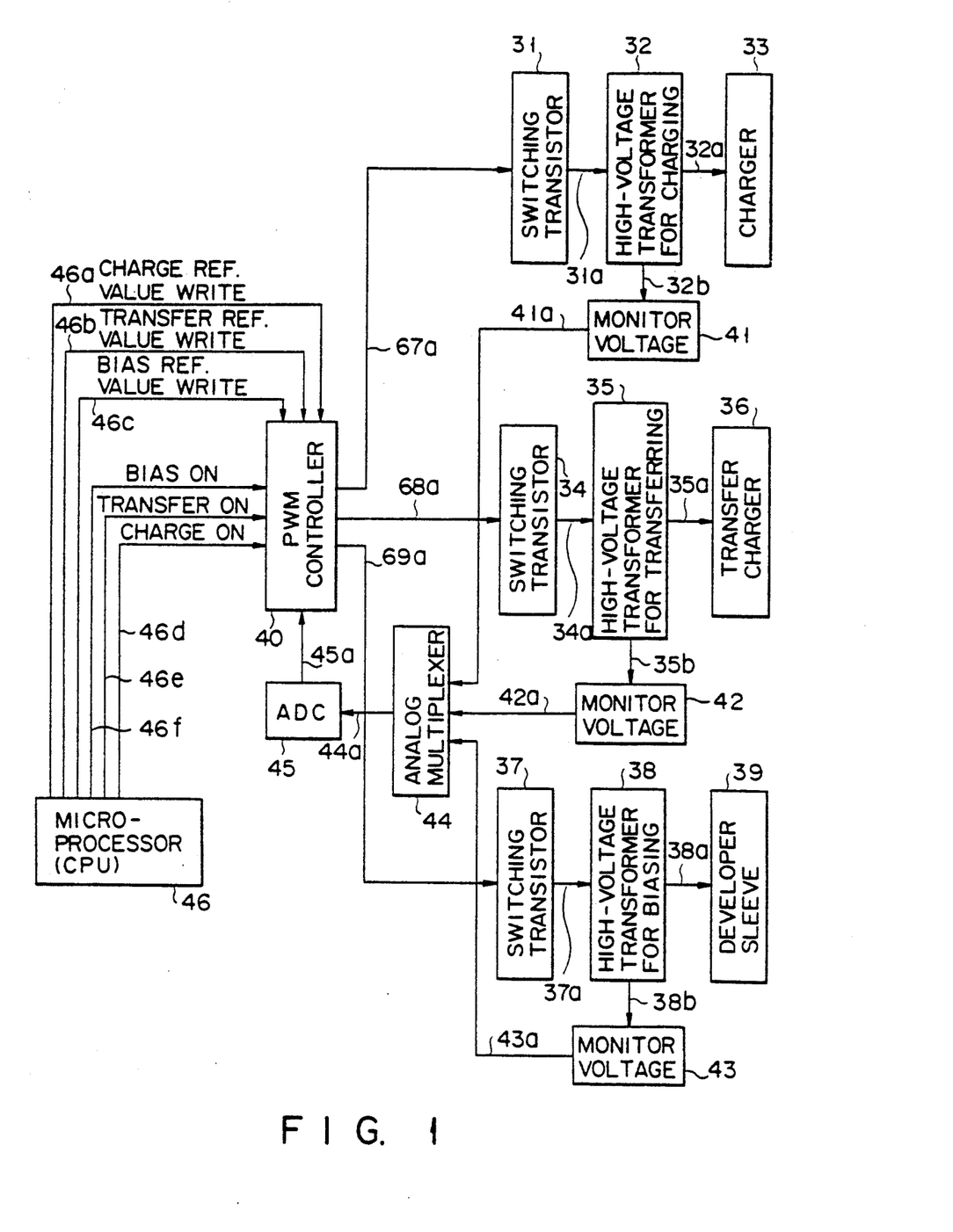
FIG. 1 shows a configuration of a high voltage power supply control apparatus according to an embodiment of the present invention.

As shown in FIG. 1, high voltage transformer 32 for charging is caused to generate a high voltage upon a switching operation of switching transistor 31, and the high voltage is applied to charger 33. High voltage transformer 35 for transferring is caused to generate a high voltage upon a switching operation of switching transistor 34, and the high voltage is applied to transfer charger 36. Furthermore, high voltage transformer 38 for biasing is caused to generate a high voltage upon a switching operation of switching transistor 37, and the high voltage is applied to developer sleeve 39.

Switching transistors 31, 34, and 37 are subjected to switching control based on pulse signals 67a, 68a, and 69a from common PWM (pulse-width modulatin) controller 40.

Changes in high voltages 32b, 35b, and 38b generated by high voltage transformers 32, 35, and 38 are monitored by monitor voltage detectors 41, 42, and 43, and their monitor outputs 41a, 42a, and 43a are supplied to analog multiplexer 44.

Analog multiplexer 44 sequentially selects the monitor outputs from monitor voltage detectors 41, 42, and 43 at predetermined timings, and supplies the selected output (44a) to common A/D converter (ADC) 45.

ADC 45 converts the input monitor voltage into digital value 45a, and supplies the digital value to PWM controller 40.

PWM controller 40 receives charge, transfer, and bias ON signals 46d, 46e, and 46f from micro processor (CPU) 46, and also receives charge, transfer, and bias reference values 46a, 46b, and 46c as write data.

Figure 2A:
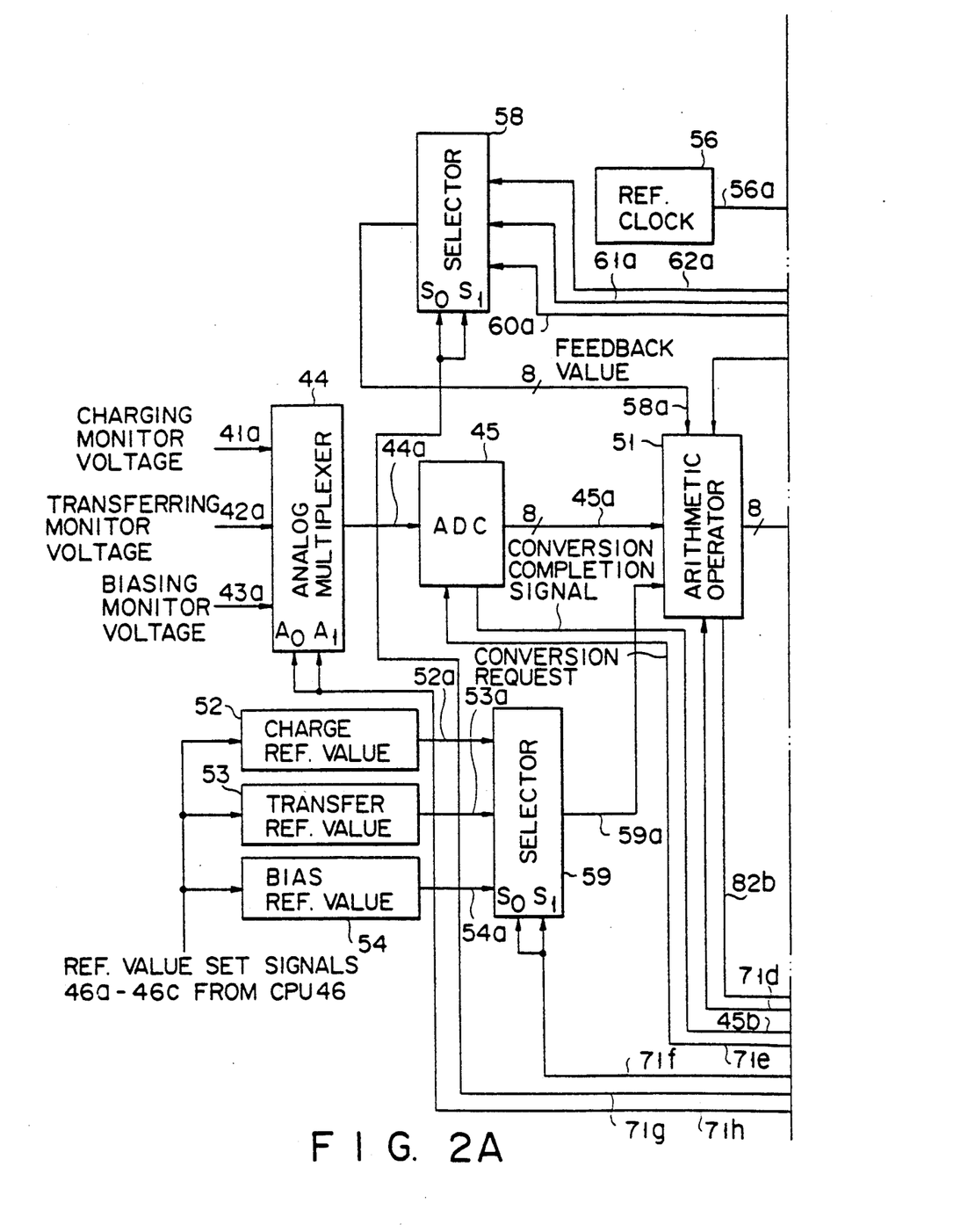
FIGS. 2A and are block diagrams showing details of the PWM controller shown in FIG. 1.
Figure 2B:
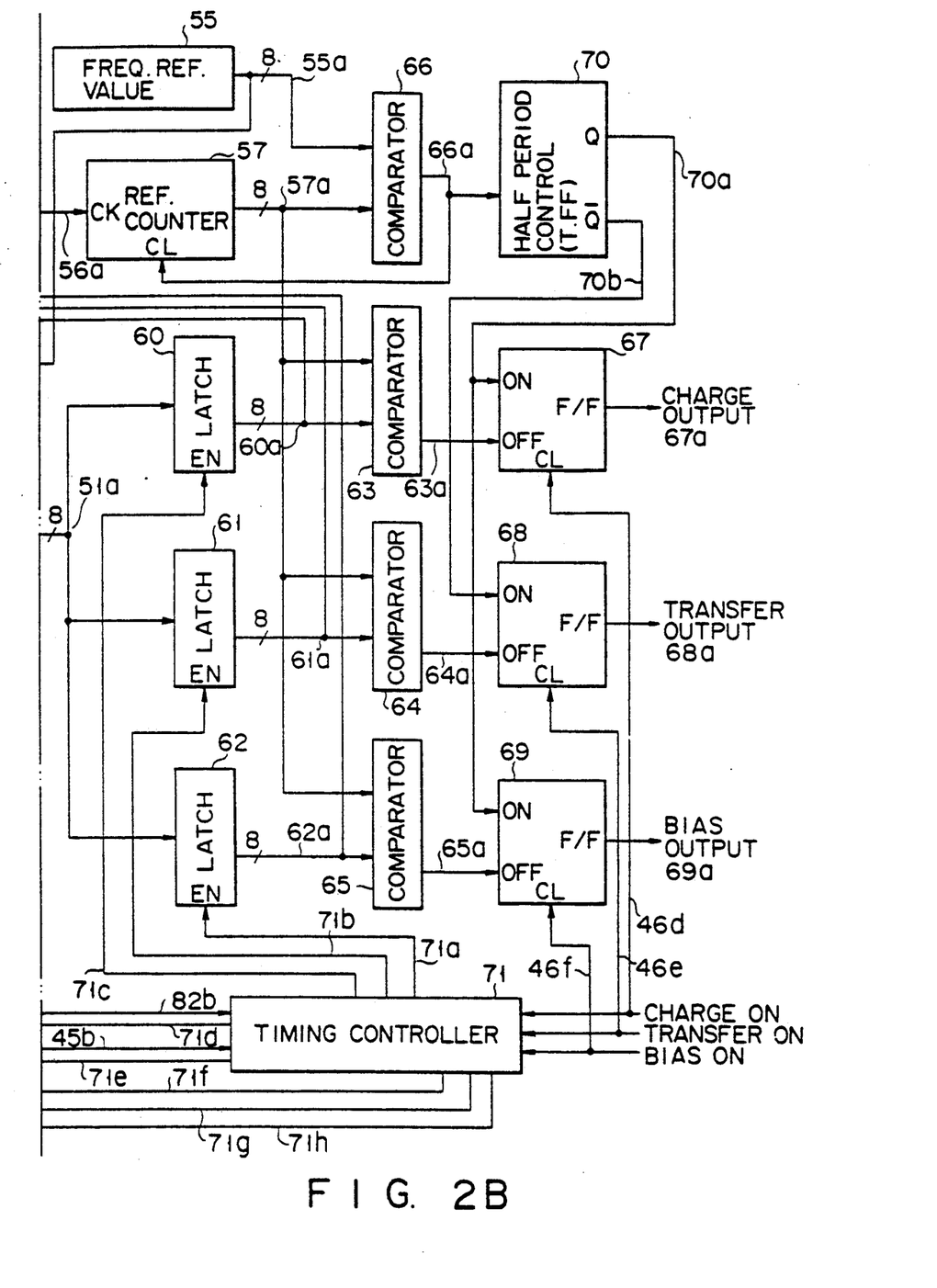

As shown in FIG. 2, PWM controller 40 comprises arithmetic operator 51, charge reference value setting unit 52, transfer reference value setting unit 53, bias reference value setting unit 54, frequency reference value setting unit 55, reference clock generator 56, reference counter 57 for counting reference clocks 56a from reference clock generator 56, first and second selectors 58 and 59, first, second, and third latches 60, 61, and 62, first, second, third, and fourth comparators 63, 64, 65, and 66, first, second, and third flip-flops (F/Fs) 67, 68, and 69, half period control circuit 70, and timing controller 71 for controlling analog multiplexer 44, ADC 45, arithmetic operator 51, first and second selectors 58 and 59, and first, second, and third latches 60, 61, and 62 at predetermined timings.

PWM controller 40 supplies digital monitor voltage 45a from ADC 45 to arithmetic operator 51, and supplies charge, transfer, and bias ON signals 46d, 46e, and 46f from CPU 46 to timing controller 71 and to clear terminals CL of first, second, and third F/Fs 67, 68, and 69.

The reference values are set in charge, transfer, and bias reference value setting units 52, 53, and 54 by write data of charge, transfer, and bias reference values 46a, 46b, and 46c from CPU 46.

Analog multiplexer 44 selects one of charge, transfer, and bias monitor voltages 41a, 42a, and 43a in accordance with control signal 71h from timing controller 71, and supplies the selected monitor voltage to ADC 45.

First selector 58 selects one of outputs 60a, 61a, and 62a from latches 60, 61, and 62 in accordance with control signal 71g from timing controller 71, and supplies the selected output as feedback value 58a to arithmetic operator 51.

Second selector 59 selects one of the reference values 52a, 53a, and 54a from charge, transfer, and bias reference value setting units 52, 53, and 54 in accordance with control signal 71f from timing controller 71, and supplies selected reference value 59a to arithmetic operator 51.

A frequency reference value from frequency reference value setting unit 55 is applied to arithmetic unit 51, and fourth comparator 66.

Figure 3:
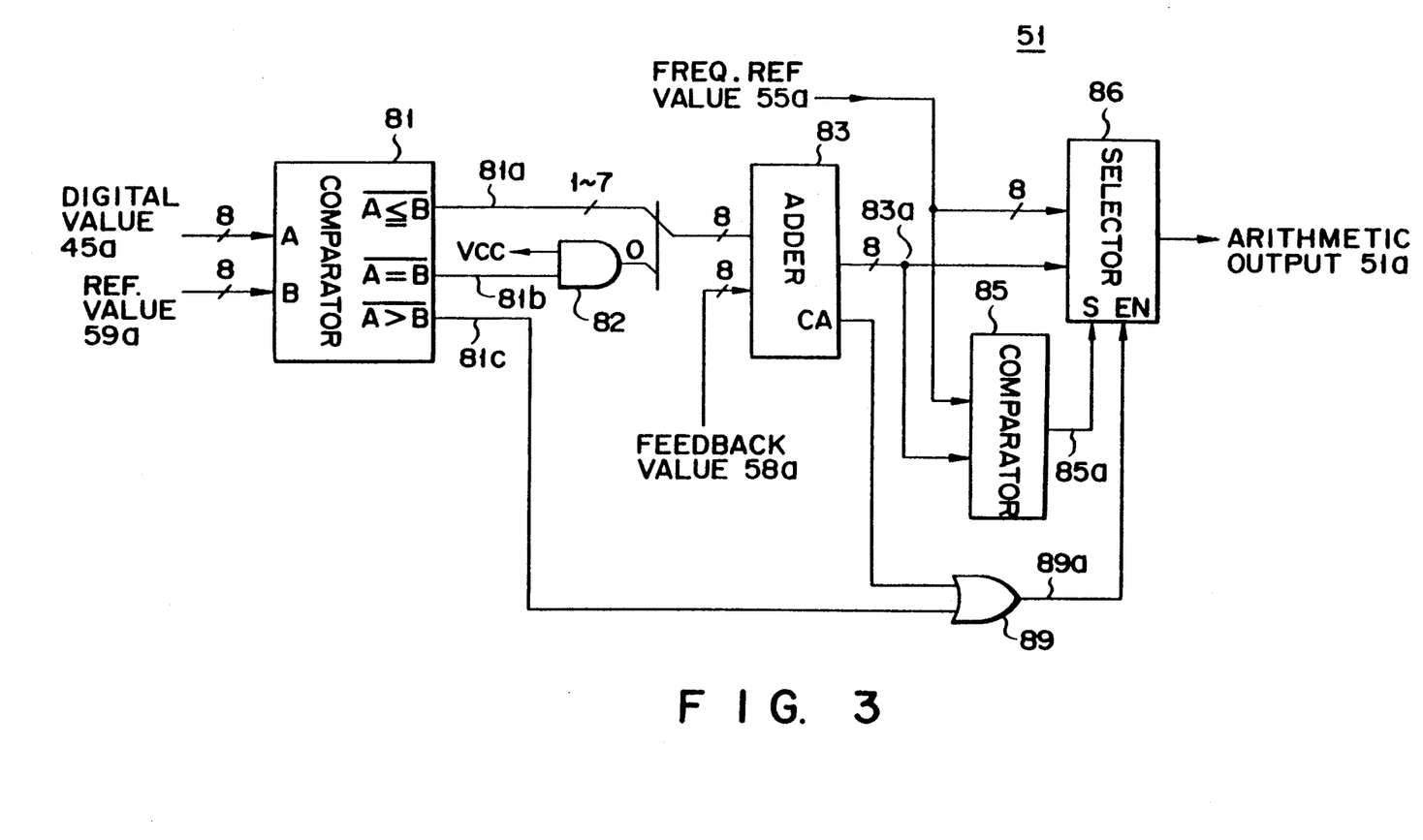
FIG. 3 shows a circuit diagram of the arithmetic operator shown in FIG. 2A.

As shown in FIG. 3, arithmetic operator 51 is formed of comparator 81, AND gate 82, adder 83, comparator 85, selector 86, and OR gate 89. Operator 51 supplies the A input of comparator 81 with digital value 45a from ADC 45. Supplied to the B input of comparator 81 is reference value 59a from second selector 59.

Comparator 81 compares digital value A of the A input with reference value B of the B input. When A<B, output terminal 81a for inverted "A≦B", output terminal 81b for inverted "A=B, and output terminal 81c for inverted "A>B", respectively output signals "L, H, H". When A=B, output terminal 81a for inverted "A≦B", output terminal 81b for inverted "A=B", and output terminal 81c for inverted "A>B", respectively output signals "L, L, H". When A>B, output terminal 81a for inverted "A≦B", output terminal 81b for inverted "A=B", and output terminal 81c for inverted "A>B", respectively output signals "H, H, L". The 7-bit output signals from inverted "A≦B" terminal 81a are supplied to one input of adder 83, via 1st-7th 7-bit- lines in 0th-8th 8-bit lines. The output signal from inverted "A=B" terminal 81b is supplied to one input of 2-input AND gate 82. The output signal from inverted "A>B" terminal 81c is supplied to one input of 2-input OR gate 89. The other input of AND gate 82 receives the Vcc voltage.

The output from AND gate 82 is supplied to the one input of adder 83, via the 0th line (least significant bit line) of the 8-bit lines.

The other input of adder 83 receives 8-bit feedback value 58a from first selector 58.

In adder 83, the 8-bit value of one input is added to the feedback value of the other input, and result 83a of the addition is supplied to one input of selector 86 as well as to one input of comparator 85.

The other input of each of selector 86 and comparator 85 is supplied with frequency reference value 55a from frequency reference value setting unit 55.

When result 83a of the addition becomes negative, carry out terminal CA of adder 83 supplies the other input of OR gate 89 with low-level signal 83b, so that signal 89a from OR gate 89 is supplied to enable terminal EN of selector 86.

Comparator 85 compares addition result 83a with frequency reference value 55a. Unless the addition result reaches the frequency reference value, signal 85a supplied from comparator 85 to selector 86 requires that selector 86 selects addition result 83a. When the addition result exceeds the frequency reference value, signal 85a supplied from comparator 85 to selector 86 requires that selector 86 selects frequency reference value 55a.

The output value from selector 86 corresponds to output value 51a from arithmetic operator 51, and is supplied to latches 60, 61, and 62, as shown in FIG. 2. Latches 60, 61, and 62 are controlled by signals 71a-71c from timing controller 71. In a charge ON state, latch 60 latches output value 51a. In a transfer ON state, latch 61 latches output value 51a. In a bias ON state, latch 62 latches output value 51a.

Latches 60, 61, and 62 respectively supply latched values 60a, 61a, and 62a to first, second, and third comparators 63, 64, and 65. Comparators 63, 64, 65, and 66 receive count value 57a from reference counter 57.

Fourth comparator 66 is activated when count value 57a from reference counter 57 coincides with frequency reference value 55a from frequency reference value setting unit 55, and supplies its output 66a to clear terminal CL of reference counter 57 and also to half period control circuit 70. Frequency reference value 55a from frequency reference value setting unit 55 is set to be half a transistor switching frequency, and half period control circuit 70 shifts ON timings of first and third F/Fs 67 and 69 from that of second F/F 68 by a half period. More specifically, Q terminal output 70a from half period control circuit 70 is supplied to the ON terminals of first and third F/Fs 67 and 69, and Q̄ terminal output 70b is supplied to the ON terminal of second F/F 68, thereby shifting charge and bias ON periods from a transfer ON period by a half period.

First, second, and third comparators 63, 64, and 65 are activated when count value 57a from reference counter 57 matches outputs 60a, 61a, and 62a from latches 60, 61, and 62, and supply their outputs 63a, 64a, and 65a to the OFF terminals of first, second, and third F/Fs 67, 68, and 69.

First, second, and third F/Fs 67, 68, and 69 output charge, transfer, and bias outputs 67a, 68a, and 69a for driving switching transistors 31, 34, and 37, respectively.

Clear terminals CL of first, second, and third F/Fs 67, 68, and 69 receive the charge, transfer, and bias ON signals 46d, 46e, and 46f from CPU 46, respectively.

Figure 4:
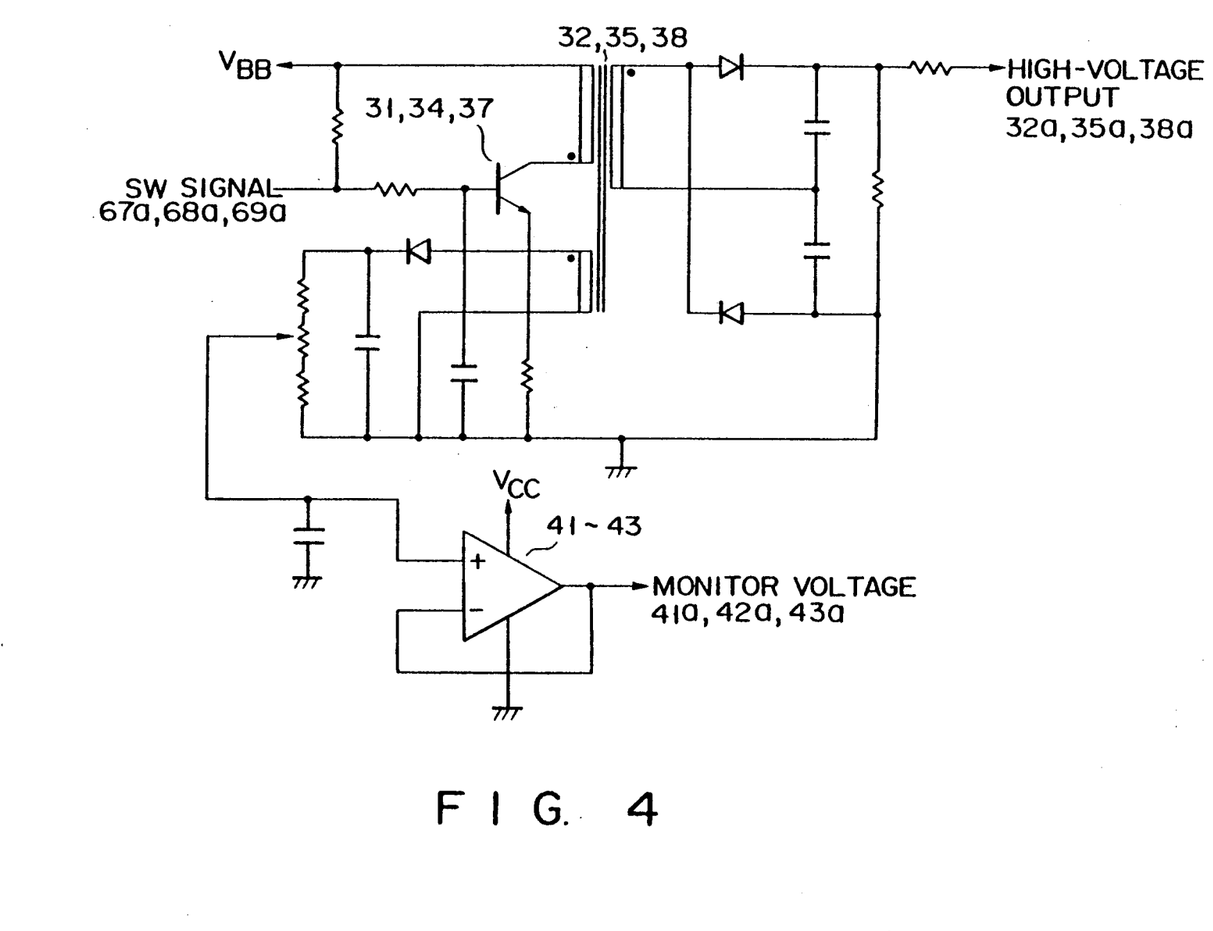
FIG. 4 is an example circuit of the monitor voltage detector and a peripheral circuit of the high voltage transformer.
Figure 5:
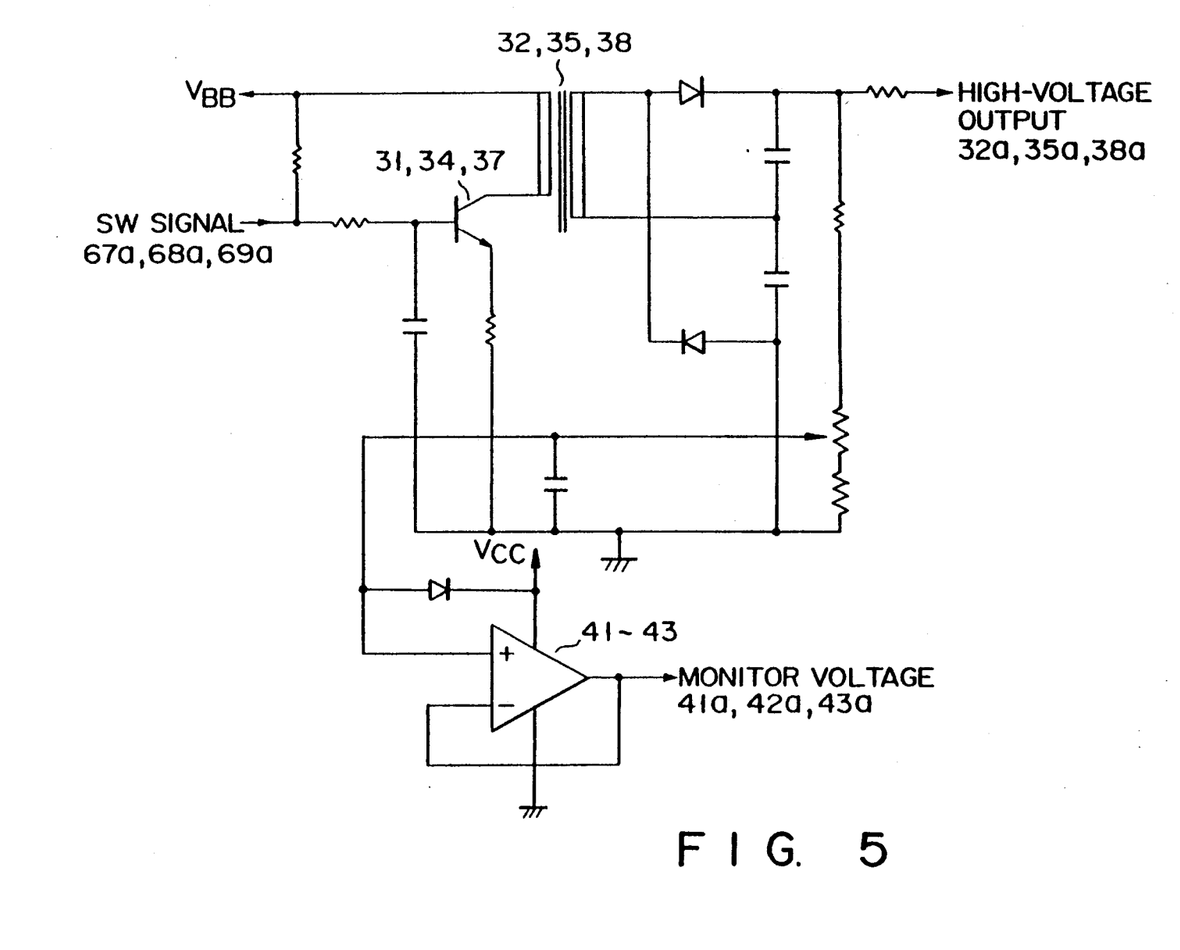
FIG. 5 and 6 are other example circuits of the monitor voltage detector and a peripheral circuit of the high voltage transformer.
Figure 6:
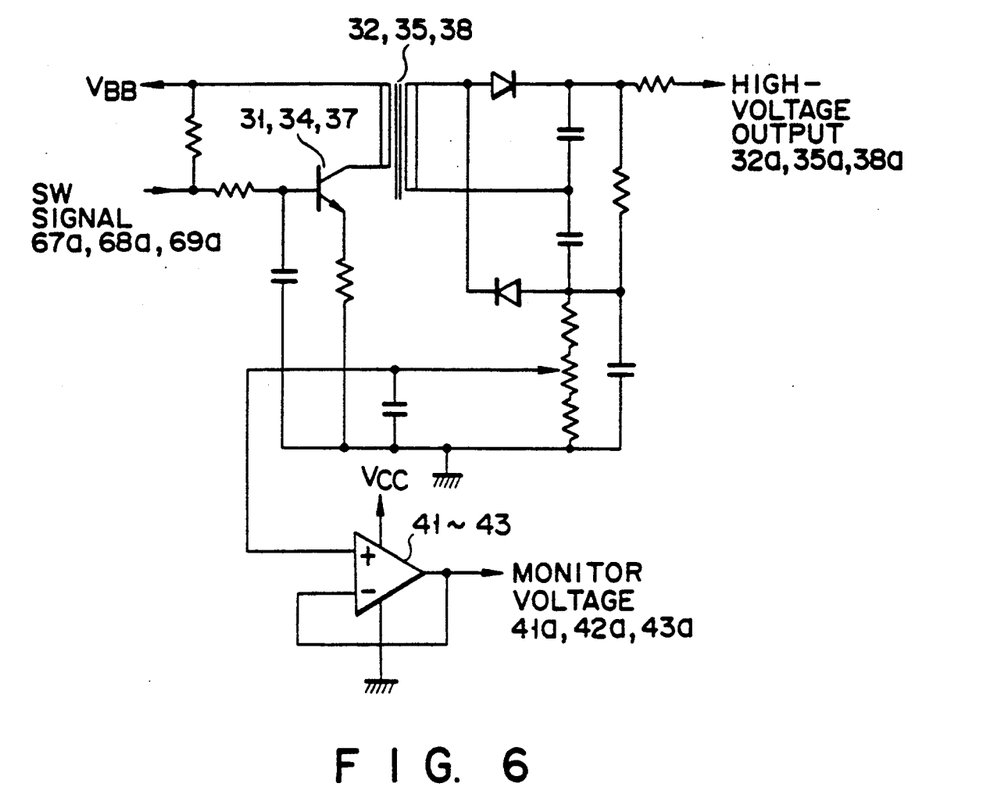

FIGS. 4 to 6 show detailed circuit arrangements constituted by switching transistors 31, 34, and 37, high voltage transformers 32, 35 and 38, and monitor voltage detectors 41, 42, and 43. Each of FIGS. 4 and 5 shows an arrangement employing a constant voltage control system, and FIG. 6 shows an arrangement employing a constant current control system.

According to this embodiment with the above arrangement, when a power switch (for VBB) is turned on. CPU 46 sets the charge, transfer, and bias reference values in setting units 52, 53, and 54 of PWM controller 40, respectively.

In this state, when CPU 46 inputs one of the charge, transfer, and bias ON signals to timing controller 71, timing controller 71 starts an operation. Timing controller 71 sequentially switches three input addresses of analog multiplexer 44 at predetermined timings. Every time the address is switched, controller 71 issues conversion request 71e to ADC 45.

Digital value 45a from ADC 45 is supplied to arithmetic operator 51. Since a monitor voltage output is zero immediately after an output ON state (at system start time), A/D-converted digital value 45a also becomes zero. Then, output signals from the inverted "A≦B" terminal of comparator 81, the inverted "A=B" terminal thereof, and the inverted "A>B" terminal thereof are "L, H, H", respectively.

In the above case, one input of adder 83 receives data of hex "01". In this case, since the feedback value to adder 83 is hex "00", adder 83 outputs hex "01". This hex value "01" is smaller than frequency reference value 55a, and the result of the arithmetic operation is not negative. Thus, selector 86 selects the output of adder 83, and outputs the adder output of hex "01". More specifically, the output from arithmetic operator 51 becomes hex "01".

According to the above operation, the duty ratio of the switching operation of switching transistors 31, 34, and 37 corresponds to the "one" clock of the reference clock from reference clock generator 56.

On the other hand, first and second selectors 58 and 59 perform selections in correspondence with the input address selection of analog multiplexer 44 under the control of timing controller 71, and respectively supply feedback value 58a and reference value 59a to arithmetic operator 51.

Latches 60, 61, and 62 are also set in a latch enable state corresponding to the input address selection of analog multiplexer 44 under the control of timing controller 71.

Fourth comparator 66 is activated when count value 57a from reference counter 57 coincides with frequency reference value 55a. Thus, first and third F/Fs 67 and 69 are enabled first, and then, second F/F 68 is enabled after an elapse of a half period. Reference counter 57 is cleared at the activation timing of fourth comparator 66.

First, second, and third comparators 63, 64, and 65 are activated when count value 57a from reference counter 57 coincides with the values respectively latched by latches 60, 61, and 62, and turn OFF first, second. and third F/Fs 67, 68, and 69, respectively.

In this manner, the duty ratio of charge output 67a to switching transistor 31 is controlled by the OFF timing of first F/F 67, the duty ratio of transfer output 68a to switching transistor 34 is controlled by the OFF timing of second F/F 68, and the duty ratio of bias output 69a to switching transistor 37 is controlled by the OFF timing of third F/F 69.

The switching periods of switching transistors 31, 34, and 37 are controlled by frequency reference value 55a, and the switching duty ratios of switching transistors 31, 34, and 37 are controlled by arithmetic output value 51a from arithmetic operator 51.

In this manner, since high voltage generation control operations for charging, transferring, and developer biasing can be controlled by using one PWM controller 40 and one ADC 45, the number of circuit members to be used can be reduced, and the apparatus can be rendered compact. Since PWM controller 40 sequentially performs high voltage generation control operations' a rest time is short, and operation efficiency can be improved.

At an early timing of an output ON state, since the latched value is zero, the duty ratio corresponds to one reference clock (56a) from reference clock generator 56.

In the subsequent arithmetic operation, since the feedback value to the other input of adder 83 has been hex "01", the output from arithmetic operator 51 becomes hex "02".

Thereafter, the output from arithmetic operator 51 increases in unit of hex "01", and the duty ratio correspondingly increases in unit of the one reference clock.

When the digital value which is analog-to-digital converted by ADC 45 reaches the reference value of reference value setting units 52, 53, and 54, A = B is obtained so that output terminal 81a for inverted "A≦B", output terminal 81b for inverted "A=B", and output signals "L, L, H".

Then, one input of adder 83 becomes hex "00", and no change appears in the duty ratio.

When A>B is obtained, output terminal 81a for inverted "A≦B", output terminal 81b for inverted "A=B", and output terminal 81c for inverted "A>B", respectively provide signals "H, H, L". Then, one input of adder 83 becomes hex "FF", and the feedback value to adder 83 is decreased by "−1" so that the duty ratio of the switching operation of switching transistors 31, 34, and 37 is decreased by the one reference clock from reference clock generator 56.

Figure 7A:
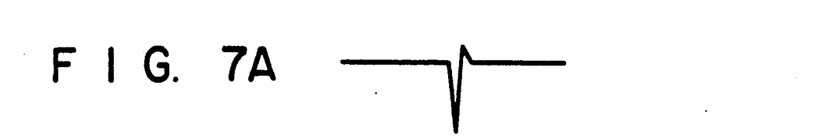
FIGS. 7A and 7B are waveform diagrams respectively illustrating a noise pulse occurring in the embodiment of FIG. 1 and a variation in an output of this embodiment.
Figure 7B:
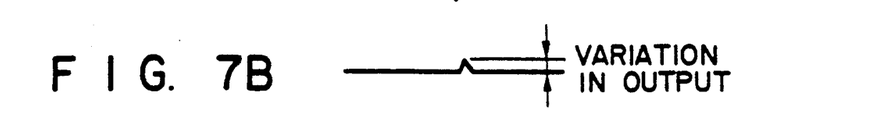

As mentioned above, a digital value corresponding to the monitor voltage is compared with a reference value, and the duty ratio is changed to be based on the result of comparison. More specifically, when digital value A < reference value B, the duty ratio is decreased by the one reference clock; when A = B, no change appears in the duty ratio; and when A>B, the duty ratio is decreased by the one reference cock. Thus, even if the digital value largely and temporarily varies due to a noise as shown in FIG. 7A, the duty ratio changes by only the minimum step amount (one clock of the reference clock). Consequently, the high voltage output from high voltage transformers 32, 35, and 38 varies only by a minimum amount as shown in FIG. 7B. In other words, the duty ratio for controlling the switching operation is less-sensitive to a noise contained in the monitor voltage, thus preventing a large deviation of the high voltage due to the noise.

Arithmetic operator 51 is not required to detect a difference between the reference value and the digitized monitor voltage, but only to detect a larger/smaller relation therebetween. Thus, there is no need for operator 51 to distinguish the booting-up operation of the apparatus and the normal operation thereof. Accordingly, the circuit configuration of arithmetic operator 51 and timing controller 71 can be made simple.

Incidentally, a dead time of the duty ratio may be predetermined. (The term "dead time" means the time interval between a change in the input and the response thereto). In this case, microprocessor 46 can detect an abnormal condition of the apparatus if the duty ratio reaches the dead time, thereby cutting off the high voltage safely.

More specifically, when the circuit of FIG. 4 or 5 is used, the monitor voltage becomes zero when the high voltage output is short-circuited. If the condition of this short circuit continues, the duty ratio of the output increased to the dead time. Microprocessor 46 is informed of this increase so that the high voltage output is cutt-off.

On the other hand, when the circuit of FIG. 6 is used, the monitor voltage becomes substantially zero when no current flows due to the circuit-open of the high voltage output circuit. If this condition continues, the duty ratio of the output increased to the dead time, and microprocessor 46 is informed of this increase so that the high voltage output is cut-off.

Furthermore, a means for directly comparing digital value 45a from ADC 45 with upper and lower limit values for detecting an error may be arranged, and when the digital value falls outside a range defined between the upper and lower limit values, an error signal may be output to inform an abnormality to CPU 46.

Figure 8:
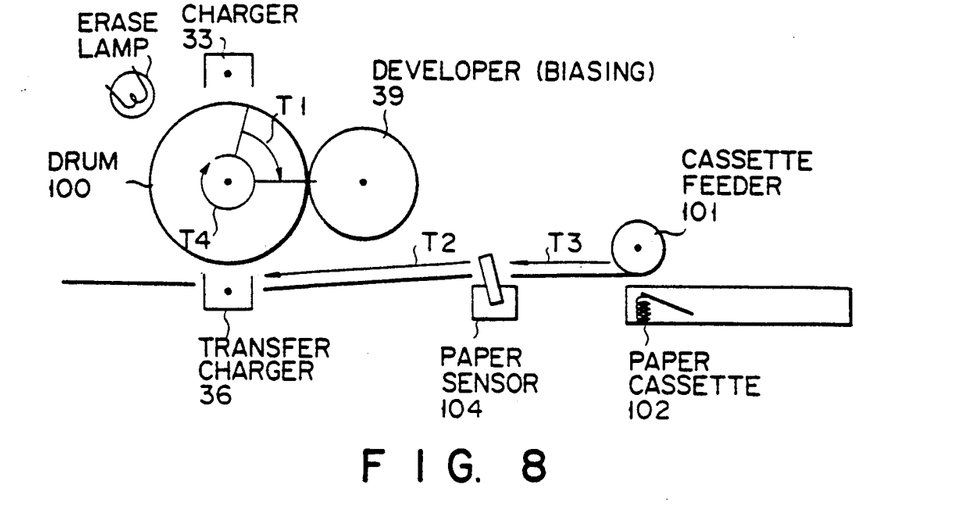
FIG. 8 illustrates a schematic mechanical configuration of an electronic photographing apparatus to which a high voltage power supply control apparatus of the invention can be applied.

FIG. 8 illustrates a schematic mechanical configuration of an electronic photographing apparatus to which a high voltage power supply control apparatus of the invention can be applied. FIGS. 9A-9F show signals produced by microprocessor 46 in response to the actuation of the apparatus of FIG. 8.

When a main motor (not shown) of the electronic photographing apparatus is turned ON (FIG. 9A), charger 33 is turned ON by signal 46d (FIG. 9C), and drum 100 in FIG. 8 rotates. Then, after elapsing time T1, the biasing of developer 39 is activated by signal 46f (FIG. 9D).

Thereafter, cassette feeder 101 is turned ON (FIG. 9B), to thereby draw a paper from paper cassette 102. After elapsing time T3, the position of the paper drawn form cassette 102 is detected by paper sensor 104 during the paper being fed to drum 100 (FIG. 9F). After elapsing time T2 from the paper position detection by sensor 104, transfer charger 36 is turned ON by signal 46e (FIG. 7E).

Figure 9A:
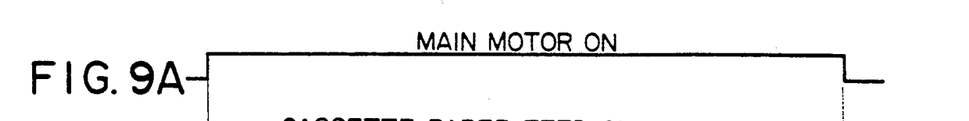
FIGS. 9A to 9F are timing charts showing signals produced by the microprocessor in FIG. 1.
Figures 9B, 9C, 9D, 9E, 9F:
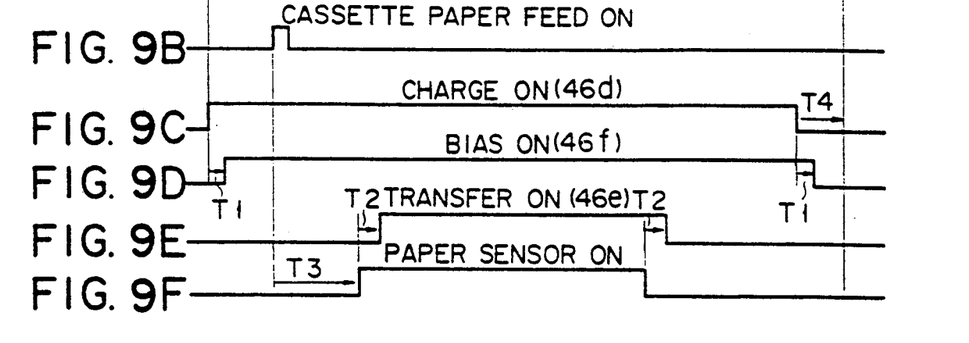

When the transferring operation to the paper is completed. charger 33 is turned OFF (FIG. 9C). Then, after elapsing time T1, the biasing of developer 39 is stopped (FIG. 9D), and the main motor is turned OFF after elapsing time T4 (FIG. 9A).

According to the above operations, microprocessor 46 in FIG. 1 generates signals 46d (FIG. 9C), 46e (FIG. 9E), and 46f (FIG. 9D).

FIGS. 10A-10G are timing charts showing signals produced by timing controller 71 in FIG. 2B.

Assume that A, B, and C denote a charging process period, biasing process period, and transferring process period, respectively, and that D denotes one operation cycle period of timing controller 71. Under this assumption. in sequence of periods A, B, and C during period D; A/D conversion, arithmetic operation and latching of the result of the arithmetic operation are repeated for each of charging, biasing, and transferring. In this case, while one processing (e.g., transferring) is selected (i.e. turned-ON), the remains (charging & biasing) are stopped (i.e. turned-OFF).

Figures 10A, 10B:
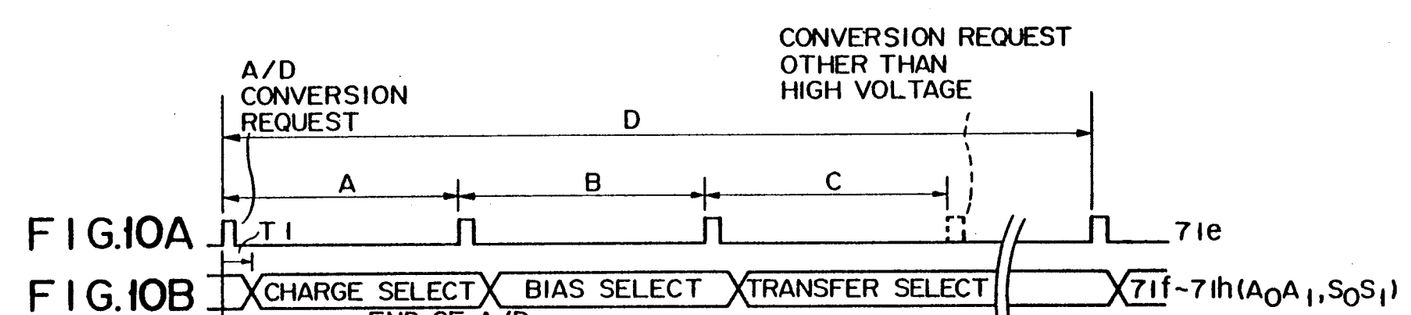
FIGS. 10A to 10G are timing charts showing signals produced by the timing controller in FIG. 2B.
Figure 10C:
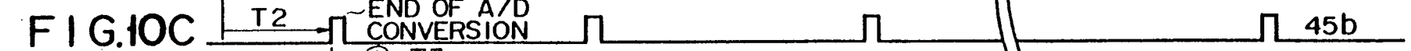
Figure 10D:
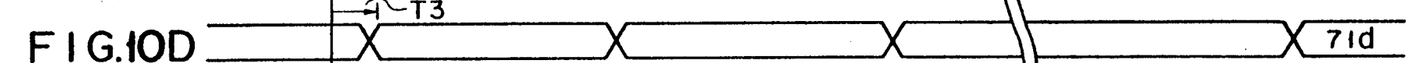

When entered to charging process period A, timing controller 71 outputs A/D conversion request 71e (FIG. 10A). After elapsing T1, the charging processing is first selected by signals 71f-71h (FIG. 10B). Thereafter, within a period of T2, the conversion by A/D converter 45 is completed, and conversion completion signal 45b is generated (FIG. 10C).

After elapsing time T3 from the generation of conversion completion signal 45b, signal 71d is output (FIG. 10D), so that hex "01" (at starting of the system) or hex "FE" (during normal operation) is selected.

Figure 10E:
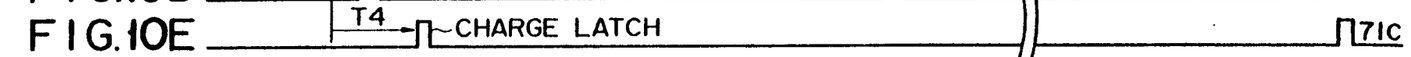
Figure 10F:
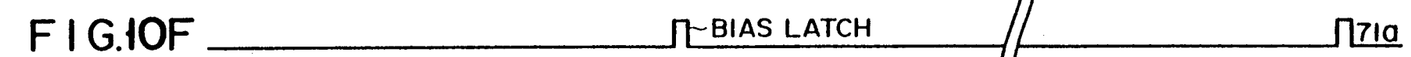
Figure 10G:
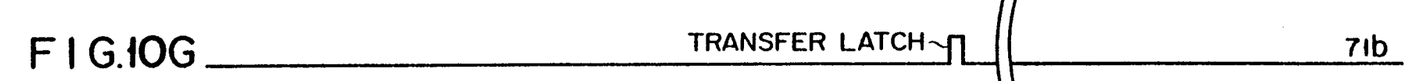

After elapsing time T4 from the generation of conversion completion signal 45b, timing controller 71 outputs charging latch signal 71c (FIG. 10E). By signal 71c, the result of charging process (i.e. charging monitor voltage 41a) is held at latch 60 in FIG. 2B.

In a similar manner, the result of biasing process (i.e. biasing monitor voltage 43a) is held by signal 71a (FIG. 10F) at latch 62 during period B, and the result of transferring process (i.e. transferring monitor voltage 42a) is held by signal 71b (FIG. 10G) at latch 61 during period C.

Incidentally, the above periods may be set normally as A=B=C and D>>A+B+C.

Figure 11:
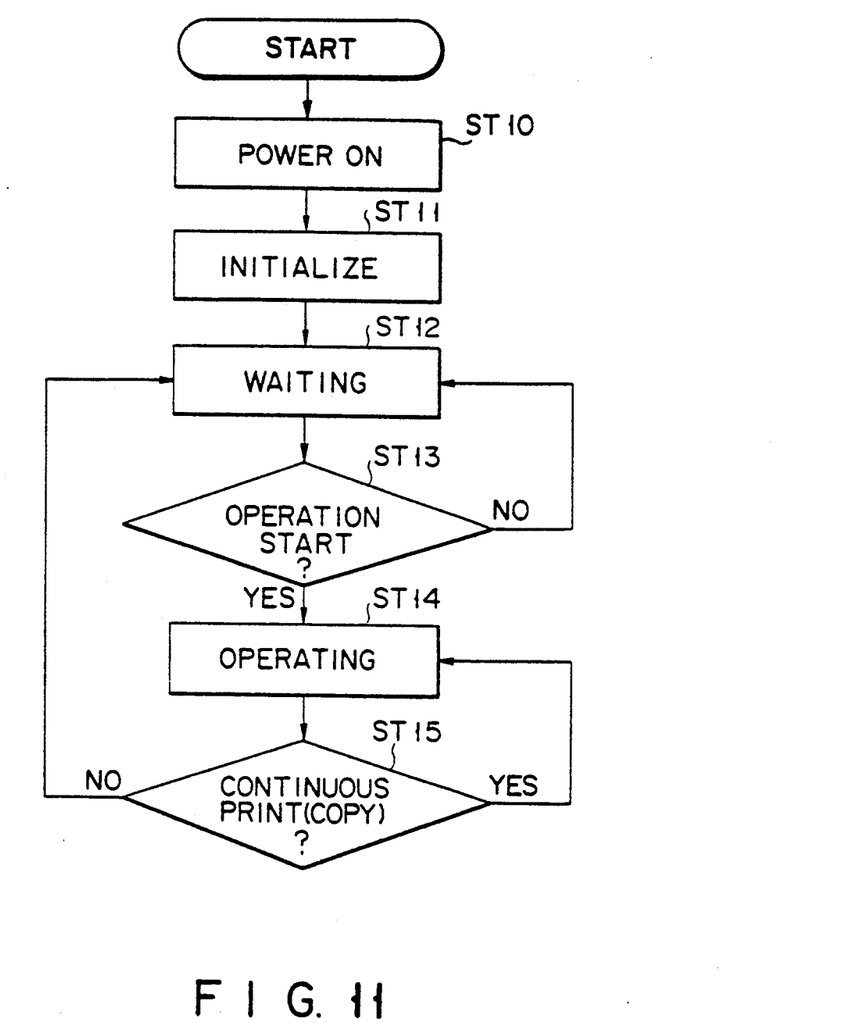
FIG. 11 is a flow chart for explaining operation of the microprocessor in FIG. 1.

FIG. 11 is a flow chart for explaining the control operation of microprocessor 46 in FIG. 1.

When the power of the apparatus is turned ON (ST10), the apparatus is initialized by signals 46a-46c (ST11). When the initialization is completed, the apparatus enters a waiting stage for next operation (ST12). When a copy operation starts (YES in ST13), for example, given operations are performed with timing of the signals shown in FIGS. 9A-9F (ST14). If these operations are tasks of a continuous operation, they are repeated until the continuous operation is finished (YES in ST15). When the operation is finished, the control returns to the waiting stage of step ST12.

Incidentally, when the apparatus of FIG. 1 is provided with an operation mode in which respective reference values of charging, transferring, and biasing can be switchable, the initialization processing may be performed in the waiting stage of step ST12.

In this embodiment, the present invention is applied to high voltage generation control in an electrophotographic mechanism section. However, the present invention is not always limited to this.

As described above, according to the present invention, a high voltage power supply controlling apparatus, which can use one PWM controller and one A/D converter commonly in a plurality of high voltage generation control operations, can, therefore, reduce the number of circuit members to be used, can render the apparatus compact, and can improve operation efficiency of the PWM controller, can be provided.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power supply control apparatus comprising:
   power generating means for generating electric power in response to a switching control signal having a given duty ratio;
   detecting means for detecting the electric power generated by said power generating means and for outputting a monitor voltage corresponding to the detected electric power, said monitor voltage being susceptible to containing noise components; and
   controlling means for controlling the generated electric power to a predetermined value in accordance with the duty ratio of said switching control signal, such that the duty ratio is changed by a minimum unit amount in response to the monitor voltage so as to render the duty ratio less sensitive to noise contained in the monitor voltage.

2. An apparatus according to claim 1, wherein said controlling means includes:
   duty ratio control signal generating means for comparing a predetermined reference value with a monitor value corresponding to the monitor voltage so as to generate a duty ratio control signal responsive to which the duty ratio of said switching control signal is changed by the minimum unit amount when the monitor value differs from the predetermined reference value, the duty ratio of said switching control signal not being changed when the monitor value matches the predetermined reference value; and
   means for generating said switching control signal having the duty ratio corresponding to the duty ratio control signal generated by said duty ratio control signal generating means.

3. An apparatus according to claim 2, wherein said duty ratio control signal generating means includes:
   first means for comparing the monitor value with the predetermined reference value so as to generate a first signal when the monitor value is smaller than the predetermined reference value;
   second means for comparing the monitor value with the predetermined reference value so as to generate a second signal when the monitor value matches the predetermined reference value;
   third means for comparing the monitor value with the predetermined reference value so as to generate a third signal when the monitor value is larger than the predetermined reference value;
   fourth means, responsive to generation of said first signal by said first means, for generating a duty ratio control signal responsive to which the duty ratio of said switching control signal is increased by the minimum unit amount;
   fifth means, responsive to generation of said second signal by said second means, for generating a duty ratio control signal responsive to which the duty ratio of said switching control signal is not changed; and
   sixth means, responsive to generation of said third signal by said third means, for generating a duty ratio control signal responsive to which the duty ratio of said switching control signal is decreased by the minimum unit amount.

4. An apparatus according to claim 3, wherein said controlling means further includes:
   means for converting an analog amount of the monitor voltage into a digital value; and digital control means for changing the duty ratio of said switching control signal, so that the digital value approaches a predetermined digital reference value.

5. An apparatus according to claim 4, wherein said digital control means includes:
- duty ratio control signal providing means for providing a duty ratio control signal in response to detection of a difference between the digital value and the digital reference value;
- means for counting a reference clock having a predetermined cyclic period to output a count value;
- means for outputting a coincidence signal in response to detection of a matching between the count value and the duty ratio control signal;
- means for generating a frequency reference value having a cyclic period which is half of a cyclic period of the switching control signal;
- means for outputting a set signal in response to detection of a matching between the count value and the frequency value; and
- means for generating said switching control signal in response to alternative triggering by said coincidence signal and said set signal.

6. An apparatus according to claim 5, wherein said duty ratio control signal providing means includes;
- means for temporarily storing the duty ratio control signal to provide a predetermined feedback value.

7. An apparatus according to claim 6, wherein said duty ratio control signal providing means further includes:
- means for adding either of said first, second, so that third signals to the feedback value to output an added value; and
- means for comparing the added value with the frequency reference value, so that the added value is outputted as said duty ratio control signal when the added value is smaller than the frequency reference value, and the frequency reference value is outputted as said duty ratio control signal when the added value is larger than the frequency reference value.

8. An apparatus according to claim 1, wherein said detecting means includes:
- means for an electric amount corresponding to a voltage applied to a load to which the generated electric power is supplied, and for outputting the detected electric amount as said monitor voltage.

9. An apparatus according to claim 1, wherein said detecting means includes:
- means for detecting an electric amount corresponding to a current flowing through a load to which the generated electric power is supplied, and for outputting the detected electric amount as said monitor voltage.

10. An apparatus according to claim 1, wherein said power generating means includes:
- a switching element for performing a switching operation responsive to the duty ratio of said switching control signal; and
- a transformer having a primary winding connected to said switching element and having a secondary winding from which voltage corresponding to the generated electric power is supplied to a given load.

11. An apparatus according to claim 1, wherein said power generating means includes:
- a first switching element for performing a switching operation responsive to the duty ratio of a first switching control signal;
- a first transformer having a primary winding connected to said first switching element and having a secondary winding from which a first voltage corresponding to the generated electric power is supplied to a first load;
- a second switching element for performing a switching operation responsive to the duty ratio of a second switching control signal;
- a second transformer having a primary winding connected to said second switching element and having a secondary winding from which a second voltage corresponding to the generated electric power is supplied to a second load;
- a third switching element for performing a switching operation responsive to the duty ratio of a third switching control signal; and
- a third transformer having a primary winding connected to said third switching element and having a secondary winding from which a third voltage corresponding to the generated electric power is supplied to a third load,
- wherein said first load includes a charger of an electronic photographing apparatus, said second load includes a transfer charger thereof, and said third load includes a developer thereof.

12. An apparatus according to claim 1, wherein said minimum unit amount is a predetermined fixed value.

13. A power supply control apparatus having a high voltage transformer, in which a high voltage generated by a switching operation of a switching means is applied from the high voltage transformer to a load, said power supply control apparatus comprising:
- means for converting an analog monitor voltage, detected by a monitoring means, into a digital value;
- arithmetic means for comparing a predetermined reference value with the digital value converted by the converting means, and for performing an arithmetic operation between a predetermined minimum value and a feedback value obtained in responsive to a result of the comparison, so as to provide an arithmetic output;
- means for latching the arithmetic output so as to supply a latched value, as the feedback value, to the arithmetic means;
- means for counting a reference clock to provide a count value; and
- means for controlling by a minimum step a duty ratio for controlling the switching operation of the switching means in accordance with a predetermined frequency reference value, the value latched by the latching means, and the count value of the counting means.

14. A power supply control apparatus according to claim 13, wherein said minimum step is a predetermined fixed value.

* * * * *